United States Patent
Sugiura et al.

(10) Patent No.: US 9,348,027 B2
(45) Date of Patent: May 24, 2016

(54) ULTRASONIC SENSOR DEVICE

(75) Inventors: Makiko Sugiura, Hekinan (JP);
Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 372 days.

(21) Appl. No.: 14/117,050

(22) PCT Filed: Jun. 12, 2012

(86) PCT No.: PCT/JP2012/003802
§ 371 (c)(1),
(2), (4) Date: Nov. 12, 2013

(87) PCT Pub. No.: WO2012/172775
PCT Pub. Date: Dec. 20, 2012

(65) Prior Publication Data
US 2014/0157902 A1    Jun. 12, 2014

(30) Foreign Application Priority Data

Jun. 13, 2011   (JP) .................... 2011-131411

(51) Int. Cl.
*G01S 15/50* (2006.01)
*B06B 1/06* (2006.01)
*G01S 7/521* (2006.01)

(52) U.S. Cl.
CPC .............. *G01S 15/50* (2013.01); *B06B 1/0666* (2013.01); *G01S 7/521* (2013.01)

(58) Field of Classification Search
CPC ........ B06B 1/0666; G01S 7/521; G01S 15/50
USPC ........................................... 73/627
See application file for complete search history.

(56) References Cited

U.S. PATENT DOCUMENTS 3,139,603 A * 6/1964 Church ............... B06B 1/0622
                                              310/322
4,635,484 A    1/1987 Lerch
(Continued)

FOREIGN PATENT DOCUMENTS

GB    2083695 A    3/1982
JP     618033 A    1/1986
(Continued)

OTHER PUBLICATIONS

International Search Report and Written Opinion of the International Searching Authority mailed Jul. 17, 2012 for the corresponding international application No. PCT/JP2012/003802 (with English translation).

*Primary Examiner* — J M Saint Surin
(74) *Attorney, Agent, or Firm* — Posz Law Group, PLC

(57) ABSTRACT

An ultrasonic sensor device includes a substrate, a piezoelectric vibrator, and a Q-factor adjuster. The piezoelectric vibrator includes a pair of detection electrodes that face each other in a thickness direction of the substrate and a piezoelectric body interposed between the electrodes. The piezoelectric vibrator provides a membrane structure which is formed on a surface of the substrate and has rigidity lower than that of a remaining portion of the substrate. An ultrasonic wave is transmitted by the piezoelectric vibrator, and its reflected wave is received by the same piezoelectric vibrator. The Q-factor adjuster adjusts a Q-factor of the piezoelectric vibrator so that the Q-factor can be larger during a transmission period where the piezoelectric vibrator transmits the ultrasonic wave than during a reception period where the piezoelectric vibrator receives the ultrasonic wave.

17 Claims, 11 Drawing Sheets

(56) References Cited

U.S. PATENT DOCUMENTS

| | | | |
|---|---|---|---|
| 6,023,973 A * | 2/2000 | Yabe | G01C 19/5663 310/316.01 |
| 7,730,785 B2 | 6/2010 | Wado et al. | |
| 2002/0007118 A1 | 1/2002 | Adachi et al. | |
| 2004/0226378 A1 * | 11/2004 | Oda | B06B 1/0215 73/586 |
| 2006/0043843 A1 | 3/2006 | Sugiura et al. | |
| 2006/0196267 A1 * | 9/2006 | Takahashi | G01C 19/5663 73/504.12 |
| 2007/0040477 A1 | 2/2007 | Sugiura et al. | |
| 2008/0116765 A1 | 5/2008 | Sugiura et al. | |

FOREIGN PATENT DOCUMENTS

| | | |
|---|---|---|
| JP | 2199994 A | 8/1990 |
| JP | 03-133300 A | 6/1991 |
| JP | 2000253494 A | 9/2000 |
| JP | 2002188946 A | 7/2002 |
| JP | 2003284182 A | 10/2003 |
| JP | 200694459 A | 4/2006 |
| JP | 2006332991 A | 12/2006 |
| JP | 4254411 B2 | 4/2009 |

* cited by examiner

ULTRASONIC SENSOR DEVICE

CROSS REFERENCE TO RELATED APPLICATION

This application is a U.S. national stage application of PCT/JP2012/003802 filed on Jun. 12, 2012, and is based on Japanese Patent Application No. 2011-131411 filed on Jun. 13, 2011, the contents of which are incorporated herein by reference.

TECHNICAL FIELD

The present disclosure relates to an ultrasonic sensor device including an ultrasonic sensor with a piezoelectric vibrator on a thin portion of a substrate and configured to transmit an ultrasonic wave and receive its reflected wave by the same piezoelectric vibrator. In particular, the present disclosure relates to an ultrasonic sensor device suitable for detection of a relatively moving object.

BACKGROUND ART

As described in a patent document 1, a piezoelectric ultrasonic sensor fabricated by MEMS (Micro Electromechanical system) technique is known.

In the patent document 1, a piezoelectric vibrator is constructed with a ferroelectric interposed between a pair of electrodes arranged to face each other in a thickness direction of a substrate. The piezoelectric vibrator is formed on a thin portion of a surface of a semiconductor substrate to form an ultrasonic sensor element.

Further, in the patent document 1, a resonant frequency of the ultrasonic sensor is adjusted to a predetermined resonant frequency by applying a predetermined bias voltage between the pair of electrodes of the piezoelectric vibrator.

By the way, when a target object is moving relative to a device on which an ultrasonic sensor is mounted, a frequency of a reflected wave (a received ultrasonic wave) may be displaced from a transmission frequency due to Doppler effect of sound. In this case, the amount and direction of the displacement of the frequency are not uniform due to influences of the relative speed and direction.

Therefore, if an ultrasonic sensor is used for both transmission and reception, a frequency of a reflected wave is displaced from a transmission frequency even when a resonant frequency of the ultrasonic sensor is adjusted to a predetermined resonant frequency by applying a predetermined bias voltage between electrodes as disclosed in the patent document 1. As a result, a relatively moving target object cannot be accurately detected.

PRIOR ART

Patent Document

Patent Document 1: JP-A-2003-284182

SUMMARY OF THE INVENTION

In view of the above, it is an object of the present disclosure to provide an ultrasonic sensor device having an ultrasonic sensor for both transmission and reception and configured to accurately detect a relatively moving target object.

According to a first aspect of the present disclosure, an ultrasonic sensor device includes a substrate, a piezoelectric vibrator, and a Q-factor adjuster. The piezoelectric vibrator includes a pair of detection electrodes that face each other in a thickness direction of the substrate and a piezoelectric body interposed between the electrodes. The piezoelectric vibrator provides a membrane structure which is formed on a surface of the substrate and has rigidity lower than that of a remaining portion of the substrate. An ultrasonic wave is transmitted by the piezoelectric vibrator, and its reflected wave is received by the same piezoelectric vibrator. The Q-factor adjuster adjusts a Q-factor of the piezoelectric vibrator so that the Q-factor can be larger during a transmission period where the piezoelectric vibrator transmits the ultrasonic wave than during a reception period where the piezoelectric vibrator receives the ultrasonic wave.

According to a second aspect of the present disclosure, the ultrasonic sensor device includes a cover. The cover has a facing portion which faces the membrane structure and is spaced from membrane structure. The cover is fixed to the substrate so that a sealed space filled with gas can be formed between the cover and the substrate. The Q-factor adjuster adjusts a gap distance between the facing portion and the membrane structure, thereby adjusting the Q-factor of the piezoelectric vibrator so that the Q-factor can be larger during the transmission period where the piezoelectric vibrator transmits the ultrasonic wave than during the reception period where the piezoelectric vibrator receives the ultrasonic wave.

According to a third aspect of the present disclosure, the Q-factor adjuster includes a pair of adjustment electrodes and a controller for controlling energization of the adjustment electrodes. The adjustment electrodes face each other in the thickness direction of the substrate and generate electrostatic attractive force when being energized. One of the adjustment electrodes is formed on the ultrasonic sensor, and the other of the adjustment electrodes is formed on the cover. The electrostatic attractive force causes the facing portion of the cover to move toward the membrane structure. The controller has a voltage applying section for applying a voltage to the adjustment electrodes at least when the piezoelectric vibrator is in a receiving state. The voltage applying section controls the energization of the adjustment electrodes so that the gap distance between the facing portion of the cover and the membrane structure can be smaller when the piezoelectric vibrator is in the receiving state than when the piezoelectric vibrator is in a transmitting state.

According to a fourth aspect of the present disclosure, the substrate has a thin portion. The piezoelectric vibrator is formed on the thin portion of the surface of the substrate. The piezoelectric vibrator and the thin portion provide the membrane structure.

BRIEF DESCRIPTION OF THE DRAWINGS

The above and other objects, features and advantages of the present disclosure will become more apparent from the following detailed description made with reference to the accompanying drawings. In the drawings.

EMBODIMENTS OF THE INVENTION

Figure 1:
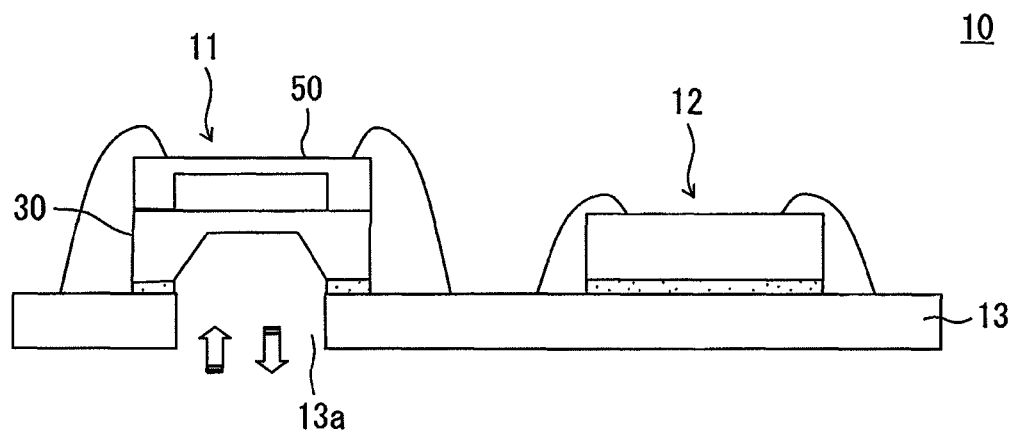
FIG. 1 is a diagram illustrating a cross-sectional view of an ultrasonic sensor device according to a first embodiment.

Embodiments of the present disclosure are described with reference to the drawings. Throughout the embodiments described below, like reference numerals depict like elements. A thickness direction of a substrate, i.e., a vibration direction of a membrane structure is referred to simply as the thickness direction, and a direction perpendicular to the thickness direction is referred to simply as the perpendicular direction.

First Embodiment

As shown in FIG. 1, an ultrasonic sensor device 10 according to the present embodiment includes a sensor unit 11 and a circuit chip 12 that are mounted on a common wiring board 13. The sensor unit 11 includes an ultrasonic sensor 30 and a cover 50. The circuit chip 12 includes a processing circuit 110. The wiring board 13 has a through hole 13a for allowing the ultrasonic sensor 30 to perform transmission and reception.

First, the sensor unit 11 is described.

Figure 2:
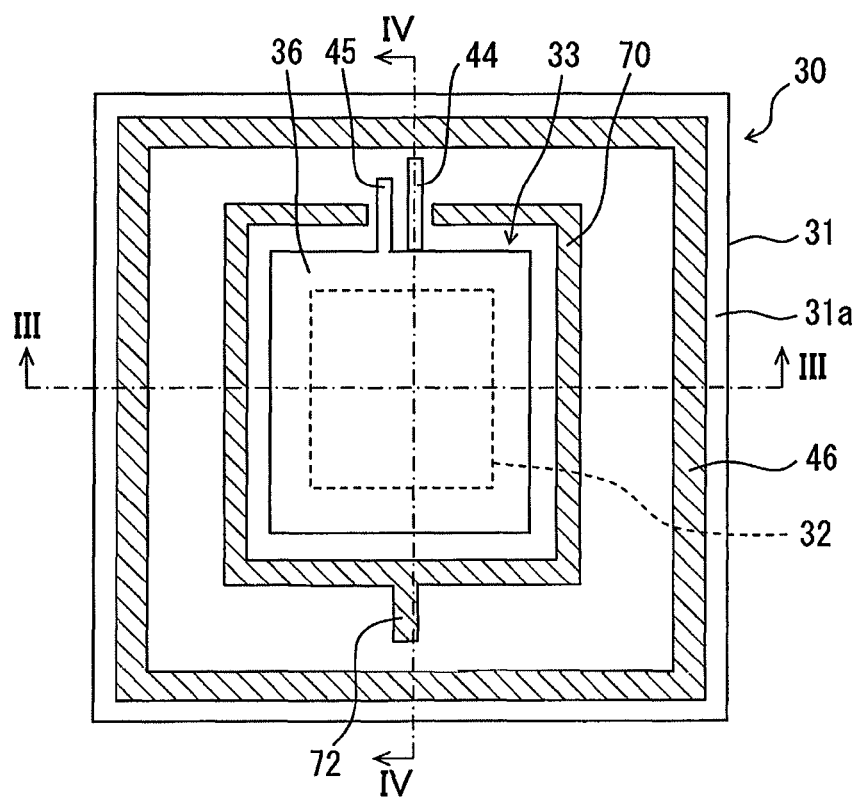
FIG. 2 is a diagram illustrating a plan view of a sensor unit of the ultrasonic sensor device, in which a cover is not shown for the sake of convenience.
Figure 3:
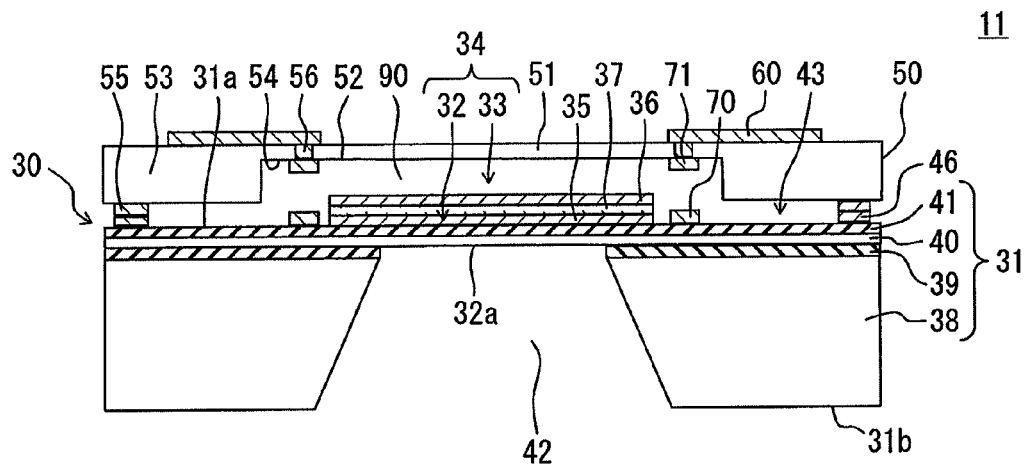
FIG. 3 is a diagram illustrating a cross-sectional view taken along line III-III in FIG. 2.
Figure 4:
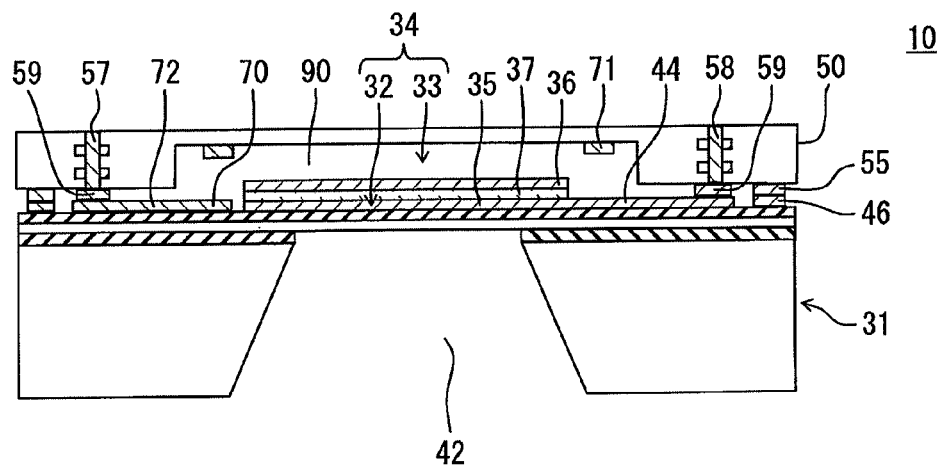
FIG. 4 is a diagram illustrating a cross-sectional view taken along line IV-IV in FIG. 2.

As shown in FIGS. 2-4, the sensor unit 11 includes a piezoelectric ultrasonic sensor 30 (a sensor chip) fabricated by MEMS technique and a cover 50 fixed to a substrate 31 of the ultrasonic sensor 30 so that a sealed space 90 can be formed between the cover 50 and the substrate 31. The sensor unit 11 further includes adjustment electrodes 70, 71. The adjustment electrodes 70, 71 are formed to the ultrasonic sensor 30 and the cover 50 respectively in such a manner that the adjustment electrodes 70, 71 face each other.

The ultrasonic sensor 30 includes the substrate 31 and a piezoelectric vibrator 33. The substrate 31 has a thin portion 32, and the piezoelectric vibrator 33 is formed on the thin portion 32 of the substrate 31. The thin portion 32 and the piezoelectric vibrator 33 provide a membrane structure 34 having rigidity lower than that of a remaining portion (thick portion 43) of the substrate 31. When the membrane structure 34 vibrates in the thickness direction, transmission and reception of ultrasonic waves are achieved.

According to the present embodiment, the substrate 31 includes a SOI substrate and an insulating film 41. The SOI substrate includes a supporting substrate 38 made from silicon, a semiconductor layer 40 made from silicon, and an insulating layer 39 made from silicon dioxide and interposed between the supporting substrate 38 and the semiconductor layer 40. The insulating film 41 is formed on the opposite surface of the semiconductor layer 40 from the insulating layer 39. The insulating film 41 can be a single-layer film or a multilayer film made from silicon dioxide, silicon nitride, or the like.

In the substrate 31, the opposite surface of the insulating film 41 from the semiconductor layer 40 is defined as a first surface 31a where the piezoelectric vibrator 33 is formed, and the opposite surface of the supporting substrate 38 from the insulating layer 39 is defined as a second surface 31b opposite to the first surface 31a. An opening portion 42 is formed in the substrate 31. The opening portion 42 is open to the second surface 31b and has a bottom defined by the opposite surface of the semiconductor layer 40 from the insulating film 41. The opening portion 42 is formed by partially removing the supporting substrate 38 and the insulating layer 39 by etching. According to the present embodiment, the second surface 31b of the substrate 31 has a (100) face, and a wall of the opening portion of the supporting substrate 38 has a (111) face.

A portion of the substrate 31 bridging over the opening portion 42, i.e., portions of the semiconductor layer 40 and the insulating film 41 bridging over the opening portion 42 serve as the thin portion 32 of the substrate 31. A symbol 32a shown in FIG. 3 represents the opposite surface of the thin portion 32 from the piezoelectric vibrator 33. The surface 32a defines the bottom of the opening portion 42 of the semiconductor layer 40. A portion of the substrate 31 except the thin portion 32 serves as a thick portion 43 of the substrate 31. As shown in FIG. 2, the thin portion 32 has a rectangular shape in plan view, and the thick portion 43 has a rectangular ring shape to surround the thin portion 32.

The piezoelectric vibrator 33 is formed on the first surface 31a of the substrate 31 in the thin portion 32. Specifically, as shown in FIG. 2, the piezoelectric vibrator 33 has a rectangular shape in plan view and is slightly larger than the thin portion to cover the whole of the thin portion 32. The piezoelectric vibrator 33 includes a pair of detection electrodes 35, 36 and a piezoelectric thin film 37 interposed between the electrodes 35, 36. The piezoelectric thin film 37 corresponds to a piezoelectric body recited in claims.

The detection electrodes 35, 36 face each other in the thickness direction. That is, the detection electrode 35, the piezoelectric thin film 37, and the detection electrode 36 are layered on top of each other in this order on the first surface 31a of the substrate 31 in the thickness direction. For example, the detection electrodes 35, 36 can be made from platinum (Pt), gold (Au), or aluminum (Al). For example, the piezoelectric thin film 37 can be made from ferromagnet such as PZT, aluminum nitride (AlN), or zinc oxide (ZnO). According to the present embodiment, the detection electrodes 35, 36 are made from Pt, and the piezoelectric thin film 37 is made from PZT. A symbol 44 shown in FIGS. 2 and 4 represents a wire for electrically connecting the detection electrode 35 to a pad of the cover 50, which is not shown in the drawings. A symbol 45 shown in FIG. 2 represents a wire for electrically connecting the detection electrode 36 to a pad of the cover 50, which is not shown in the drawings. According to the present embodiment, the wires 44, 45 are integrally formed by suing the same material as the detection electrodes 35, 36.

A metal layer 46 for fixing the cover 50 to the substrate 31 is formed on the first surface 31a of the substrate 31 in the thick portion 43. As shown in FIG. 2, the metal layer 46 is formed near an outer edge of the first surface 31a of the substrate 31 to surround the membrane structure 34, the wires 44, 45, and the adjustment electrodes 70, 71.

The cover 50 is fixed to the substrate 31 of the ultrasonic sensor 30 so that the sealed space 90 adjacent to the membrane structure 34 can be formed between the cover 50 and the substrate 31. For example, the cover 50 can be made from synthetic resin, ceramic, or semiconductor such as silicon. According to the present embodiment, the cover 50 is made from synthetic resin.

The cover 50 has a facing portion 51 which faces the membrane structure 34 and is spaced from the membrane structure 34 in the thickness direction. A portion of the cover 50 including the facing portion 51 is displaced toward the membrane structure 34 by electrostatic attractive force. Specifically, a center portion of the cover 50 including the facing portion 51 is thinner than a peripheral portion of the cover 50 surrounding the center portion. According to the present embodiment, this thinner portion is referred to as a thin portion 52, and the thicker peripheral portion is referred to as a thick portion 53. The thin portion 52 is larger than the thin portion 32 and the membrane structure 34. A portion of the thin portion 52 except the facing portion 51 faces the thick portion 43 of the substrate 31. As described above, the cover 50 is made from synthetic resin and has different thicknesses at the thin portion 52 and the thick portion 53. The cover 50 is made by partially layering and bonding multiple thermoplastic resin films together so that the thin portion 52 and the thick portion 53 can have different thicknesses.

The cover 50 is placed on the first surface 31a side of the substrate 31 in such a manner that a recess 54 with a bottom defined by the thin portion 52 faces the sealed space 90 side. A metal layer 55 is formed on a surface of the thick portion 53 of the cover 50 facing the substrate 31 and faces the metal layer 46. That is, the metal layer 55 surrounds the membrane structure 34, the wires 44, 45, and the adjustment electrodes 70, 71. The metal layers 46, 55 are joined together to form a ring-shaped junction. The sealed space 90 is formed between the cover 50 and the substrate 31 by the junction. According to the present embodiment, the sealed space 90 is filled with air under atmospheric pressure.

Further, through electrodes for allowing the detection electrodes 35, 36 of the piezoelectric vibrator 33 and the adjustment electrodes 70, 71 to be electrically connected to an outside of the sealed space 90 are formed in the cover 50. A symbol 56 shown in FIG. 3 represents a through electrode which is formed at a portion different from the facing portion 51 of the thin portion 52 and electrically connected to the adjustment electrode 71 of the cover 50. A symbol 57 shown in FIG. 4 represents a through electrode which is formed in the thick portion 53 and electrically connected to the adjustment electrode 70 of the ultrasonic sensor 30. A symbol 58 represents a through electrode which is formed in the thick portion 53 and electrically connected to the detection electrode 35 (the wire 44) of the piezoelectric vibrator 33. Although not shown in the drawings, a through electrode electrically connected to the detection electrode 36 (the wire 45) is also formed in the thick portion 53 of the cover 50. These through electrodes 56-58 can be formed by forming through holes in the resin films and then by filling the through holes with conductive paste or by plating the through holes with metal.

Further, a wire 60 is formed on an outer surface of the cover 50. One end of the wire 60 is connected to the through electrode 56, and the other end of the wire 60 is elongated to the thick portion 53. The other end of the wire 60 is used as a pad, which is not shown in the drawings, and a bonding wire or the like is connected to the pad.

It is noted that a symbol 59 shown in FIG. 4 represents a land formed on the surface of the thick portion 53 facing the substrate 31. For example, this land can be formed by patterning copper foil. The adjustment electrode 70 is electrically connected (soldered) to the through electrode 57 through a wire 72 and the land 59. Further, the detection electrode 35 is electrically connected (soldered) to the through electrode 58 through the wire 44 and the land 59. The same is true for the detection electrode 36. In this way, the cover 50, which is constructed with multiple resin films layered on top of each other, has the through electrodes 56-58, the land 59, and the wire 60. That is, the cover 50 is configured as a wiring board. It is noted that the wire 72 connects the adjustment electrode 70 to the through electrode 57 (the land 59).

When being energized, the pair of the adjustment electrodes 70, 71 generates electrostatic attractive force, thereby causing the thin portion 52 (the facing portion 51) of the cover 50 to move toward the membrane structure 34 of the ultrasonic sensor 30. The adjustment electrode 70 is formed on the ultrasonic sensor 30, and the adjustment electrode 71 is formed on the cover 50 at a position facing the adjustment electrode 70.

The adjustment electrode 70 on the ultrasonic sensor 30 is a separate electrode from the detection electrodes 35, 36. The adjustment electrode 70 is formed on the first surface 31a of the substrate 31 in the thick portion 43 and surrounds the membrane structure 34. Specifically, the adjustment electrode 70 is spaced from the membrane structure 34 by a predetermined distance in the perpendicular direction and extends along an outer shape of the membrane structure 34. The adjustment electrode 70 has a substantially C-shape to allow the wires 44, 45 to be drawn. According to the present embodiment, the adjustment electrode 70 is made from the same metal material as the detection electrodes 35, 36 and the wires 44, 45.

The adjustment electrode 71 on the cover 50 is formed on an inner surface (a surface of the recess 54) of the thin portion 52 of the cover 50. Specifically, the adjustment electrode 71 is formed on the thin portion 52 at a position outside the membrane structure 34 in the perpendicular direction. Since there is no need to draw the wires 44, 45, the adjustment electrode 71 has a rectangular ring shape. According to the present embodiment, like the land 59, the adjustment electrode 71 is formed by patterning copper foil.

As described above, in the sensor unit 11, the thin portion 32 of the substrate 31 and the piezoelectric vibrator 33 provide the membrane structure 34 which is thinner than of a remaining portion and capable of vibrating in the thickness direction. Further, the cover 50 is fixed to the first surface 31*a* of the substrate 31 so that the sealed space 90 can be formed between the substrate 31 and the cover 50. Thus, transmission and reception of ultrasonic waves are performed on the second surface 31*b* side of the substrate 31, not on the first surface 31*a* side of the substrate 31.

Figure 5:
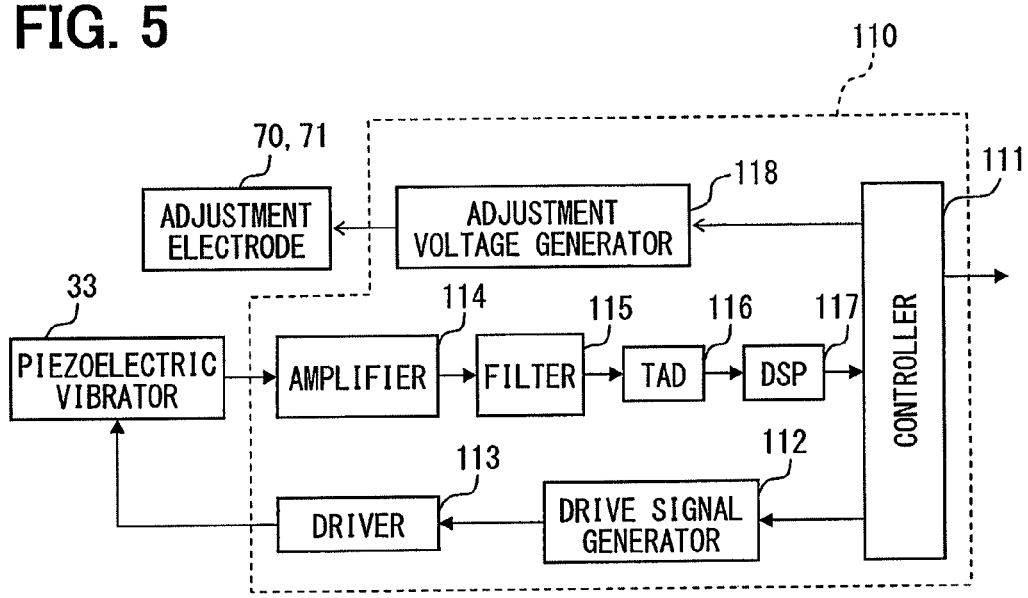
FIG. 5 is a block diagram of a circuit configuration of the ultrasonic sensor device.

Next, a circuit configuration of the ultrasonic sensor device 10 including the processing circuit 110 of the circuit chip 12 is described with reference to FIG. 5.

The processing circuit 110 includes a controller 111, a drive signal generator 112, a driver 113, an amplifier 114, a filter 115, a TAD 116, a DSP 117, and an adjustment voltage generator 118. This processing circuit 110 corresponds to a controller recited in claims.

Although not shown in the drawings, the controller 111 includes a central processing unit (CPU), a read-only memory (ROM) for storing programs executed by the CPU, and a random access memory (RAM) used when the CPU executes instructions according to the programs stored in the ROM. The controller 111 has a function to control the timing at which the drive signal generator 112 generates a drive signal, a function to detect presence or absence of a target object and a position (distance and direction) of the target object, a function to output a detection result to an external device, and a function to control the timing at which the adjustment voltage generator 118 generates an adjustment voltage.

In response to a command signal from the controller 111, the drive signal generator 112 generates a pulse signal with a reference frequency for only a predetermined time period and generates a drive signal with a predetermined frequency f1 based on the pulse signal. Specifically, the predetermined frequency f1 is almost equal to a resonance frequency of the membrane structure 34.

The driver 113 drives the piezoelectric vibrator 33 based on the drive signal outputted from the drive signal generator 112. As a result, an ultrasonic wave with the predetermined frequency f1 is transmitted from the ultrasonic sensor 30 (the sensor unit 11). According to the present embodiment, the driver 113 includes a power amplifying circuit such as a transformer.

The amplifier 114 amplifies a reception signal received by the piezoelectric vibrator 33 and outputs the amplified reception signal to the filter 115. The filter 115 filters the amplified reception signal, which is received by the piezoelectric vibrator 33 and then amplified by the amplifier 114. According to the present embodiment, frequency components outside a receiving band of the membrane structure 34 are removed.

The TAD 116 is a known time A/D converter. The DSP (digital signal processor) 117 calculates the amplitude and phase of the reception signal of the piezoelectric vibrator 33 based on the reception signal A/D-converted by the TAD 116. The calculation result is outputted to the controller 111. It is noted that the DSP 117 has a memory.

In response to a command signal from the controller 111, the adjustment voltage generator 118 applies a predetermined voltage between the adjustment electrodes 70, 71. Also, in response to a command signal from the controller 111, the adjustment voltage generator 118 stops applying the voltage between the adjustment electrodes 70, 71.

Figure 6:
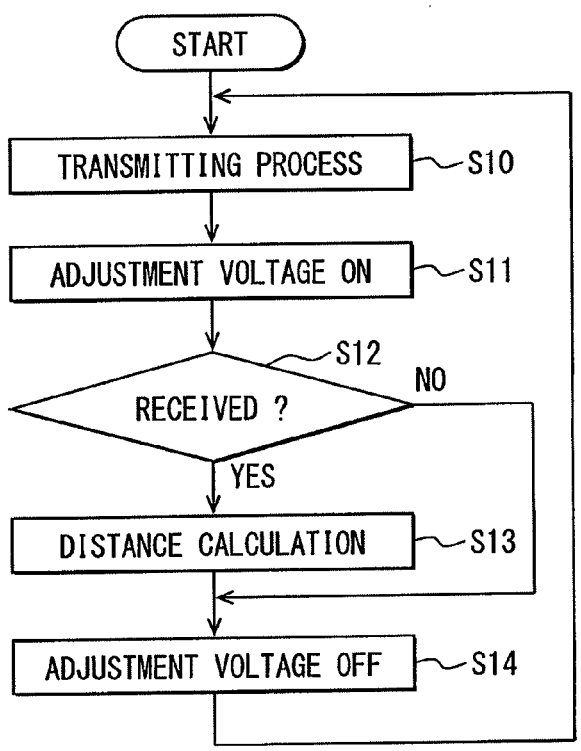
FIG. 6 is a flow chart of a transmitting and receiving process.

Next, an example of a transmitting and receiving process is described with reference to FIG. 6.

For example, when an ignition key of a vehicle is turned ON so that the processing circuit 110 can be powered ON, the controller 111 commands the drive signal generator 112 to generate the drive signal. Then, the drive signal generator 112 generates the drive signal with the predetermined frequency f1 and outputs the drive signal to the driver 113.

Then, the drive signal (voltage signal) is transmitted to the detection electrodes 35, 36 of the piezoelectric vibrator 33. As a result, the piezoelectric vibrator 33 vibrates in the perpendicular direction (d31 direction of PZT), and the membrane structure 34 vibrates in the thickness direction. Since the cover 50 is located on the first surface 31*a* side of the substrate 31, an ultrasonic wave is transmitted mainly from the second surface 31*b* side of the substrate 31 according to the vibration. A frequency of the ultrasonic wave is equal to the frequency f1 of the drive signal. These are explanation of a step 10.

Figure 7:
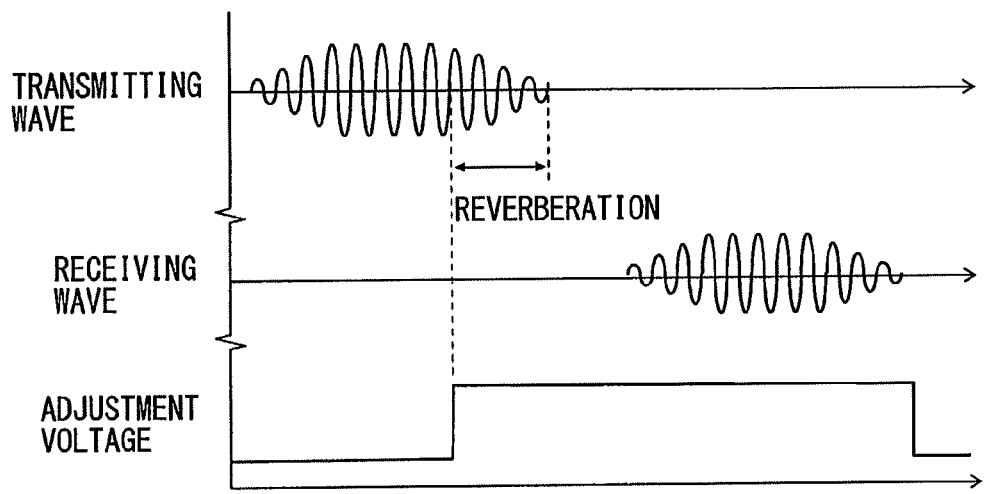
FIG. 7 is a timing chart of adjustment voltage application timing.
Figure 8:
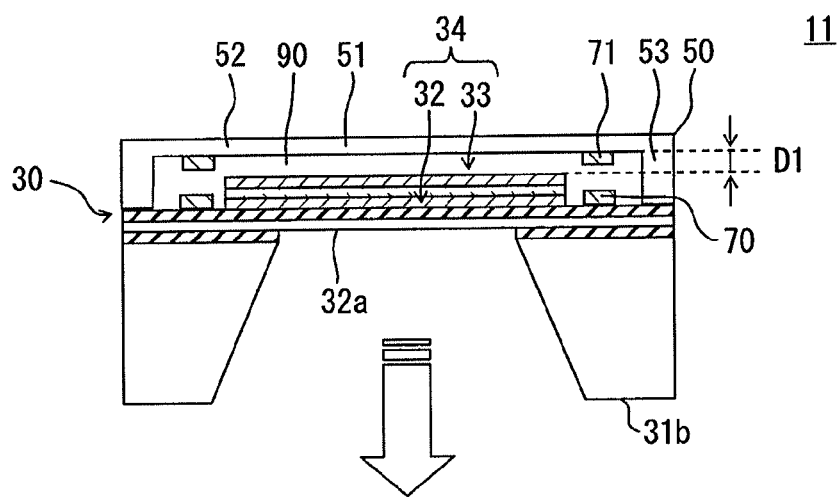
FIG. 8 is a diagram illustrating a cross-sectional view of the sensor unit in a transmitting state.

After the transmission process is finished, the controller 111 commands the adjustment voltage generator 118 to generate the adjustment voltage. Then, the adjustment voltage generator 118 applies the predetermined voltage between the adjustment electrodes 70, 71 (step 11). This step 11 corresponds to a voltage applying section recited in claims. According to the present embodiment, the transmission process is finished when the drive signal output from the drive signal generator 112 is stopped. As shown in FIG. 7, when the drive signal output is stopped, the adjustment voltage is turned ON. Alternatively, the transmission process can be finished so that the adjustment voltage can be turned ON, when a reverberation time of the membrane structure 34 elapses after the drive signal output is stopped.

Then, when the adjustment voltage is applied to the adjustment electrodes 70, 71 at step 11, the controller 111 compares the amplitude of the reception signal of the piezoelectric vibrator 33 calculated by the DSP 117 with a predetermined threshold value prestored in the memory of the DSP 117. That is, the controller 111 determines whether the ultrasonic sensor 30 (the piezoelectric vibrator 33) receives a reflected wave (step 12).

If the amplitude of the reception signal of the piezoelectric vibrator 33 is larger than the threshold value, the controller 111 determines at step 12 that a target object exists (there is a target object), the controller calculates a distance to the target object (step 13) from the timing at which the amplitude exceeds the threshold value.

Then, when a predetermined time elapses after the adjustment voltage is applied, the controller 111 commands the adjustment voltage generator 118 to stop generating the adjustment voltage. Then, the adjustment voltage generator 118 stops applying the voltage between the adjustment electrodes 70, 71 (step 14). The application of the adjustment voltage is kept at least during a time period where the piezoelectric vibrator 33 can receive the reflected wave, and the adjustment voltage is turned OFF by the time when a command to generate a next drive signal occurs.

Next, advantages of the ultrasonic sensor device 10 according to the present embodiment are described.

According to the present embodiment, the cover 50 is fixed to the piezoelectric ultrasonic sensor 30 so that the sealed space 90 filled with air can be formed between the cover 50 and the substrate 31. Further, the sealed space 90 is adjacent to the membrane structure 34. Thus, vibration of the membrane structure 34 is Influenced by damping of the sealed space 90.

A Q-factor indicative of a vibration condition of the membrane structure 34 is in inverse proportion to a damping factor C of the sealed space 90. The damping factor C is in inverse proportion to a gap distance D between the facing portion 51 of the cover 50 and the membrane structure 34. Therefore, as the gap distance D is smaller, the damping factor C is larger, and the Q-factor is smaller.

According to the present embodiment, no adjustment voltage is applied to the adjustment electrodes 70, 71, when the piezoelectric vibrator 33 is in a transmitting state, i.e., during a time period from when the output of the drive signal starts to when the output of the drive signal stops or the reverberation time elapses. Since no electrostatic attractive force is generated between the adjustment electrodes 70, 71, the facing portion 51 (the thin portion 52) of the cover 50 does not move toward the membrane structure 34 of the ultrasonic sensor 30. Therefore, with respect to a center position of vibration of the membrane structure 34, the facing portion 51 and the membrane structure 34 are spaced from each other by an initial gap distance D1 at which no ultrasonic wave is transmitted and received, and no adjustment voltage is applied.

Figure 9:
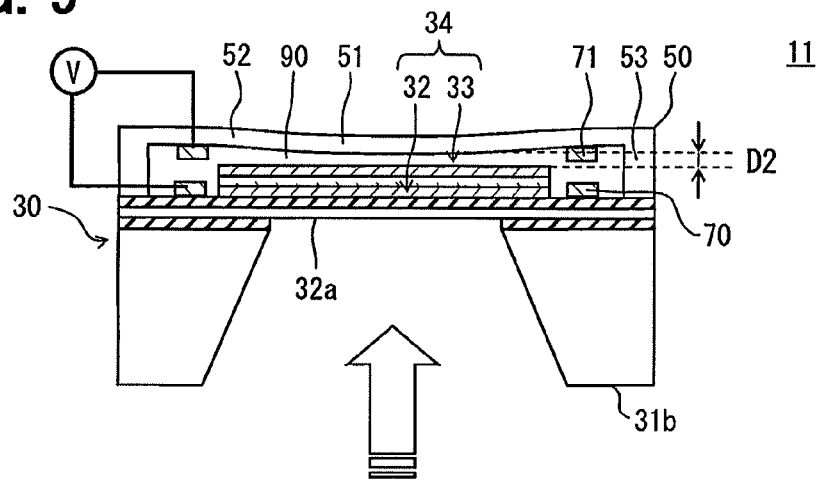
FIG. 9 is a diagram illustrating a cross-sectional view of the sensor unit in a receiving state.

In contrast, the adjustment voltage is applied to the adjustment electrodes 70, 71, when the piezoelectric vibrator 33 is in a receiving state, i.e., during a time period where the piezoelectric vibrator 33 can receive the reflected wave. Accordingly, electrostatic attractive force is generated between the adjustment electrodes 70, 71. Thus, as shown in FIG. 9, the facing portion 51 (the thin portion 52) of the cover 50 is deformed and attracted toward the membrane structure 34 of the ultrasonic sensor 30. Therefore, with respect to the center position of vibration of the membrane structure 34, the facing portion 51 and the membrane structure 34 are spaced from each other by a gap distance D2 smaller than the initial gap distance D1.

Figure 10:
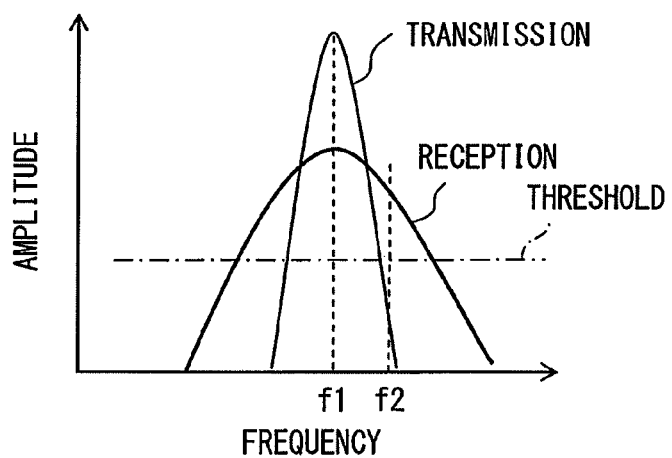
FIG. 10 is a diagram illustrating a transmitting band and a receiving band.

As described above, according to the present embodiment, the gap distance D2 in the receiving state is smaller than the gap distance D1 in the transmitting state. That is, the Q-factor is made smaller in the receiving state than in the transmitting state. Therefore, as shown in FIG. 10, although a peal value of amplitude of a frequency band of the membrane structure 34 is smaller in the receiving state than in the transmitting state, a bandwidth of the frequency band is wider in the receiving state than in the transmitting state.

Further, when the electrostatic attractive force is generated by applying the voltage between the adjustment electrodes 70, 71, the facing portion 51 moves toward the membrane structure 34. In such an approach, although the voltage is applied to the adjustment electrodes 70, 71, the resonance frequency of the membrane structure 34 can be almost the same (as the predetermined resonance frequency f1) between in the transmitting state and in the receiving state. Thus, a resonance peak displacement can be reduced.

For the above reasons, according to the present embodiment, while the resonance frequency (resonance peak) is maintained at f1, the frequency band is narrowed in the transmitting state and widened in the receiving state. In such an approach, the reflected wave, i.e., the target object can be accurately detected, even when Doppler shift occurs due to relative movement of the target object.

In the case of an ultrasonic wave of 60 kHz, when the target object moves at a relative speed of 10 m/s, the shift of about 2 kHz occurs as compared to when the target object is at rest. For example, assuming that the frequency band is unchanged between the transmission and reception of the ultrasonic wave, if the frequency of the reception signal changes to f2 higher than f1 due to Doppler shift, the reception signal becomes lower than the threshold value, so that the target object cannot be detected. In contrast, according to the present embodiment, as shown in FIG. 10, the frequency band is widened in the receiving state. Thus, even when the frequency of the reception signal changes to f2, the reception signal exceeds the threshold value, so that the target object can be detected.

Further, according to the present embodiment, the piezoelectric vibrator 33 is accommodated in the sealed space 90, which is formed between the substrate 31 and the cover 50 by fixing the cover 50 to the first surface 31a of the substrate 31. Thus, the piezoelectric vibrator 33 can be protected by the cover 50.

Further, according to the present embodiment, the adjustment electrode 70 on the ultrasonic sensor 30 is formed on the thick portion 43 of the substrate 31. Thus, the membrane structure 34 is not easily deformed by the electrostatic attractive force. Therefore, the displacement of the peak of the resonance frequency between in the transmitting state and in the receiving state can be effectively reduced.

Further, according to the present embodiment, the adjustment electrode 70 on the ultrasonic sensor 30 is formed on the first surface 31a of the substrate 31. Since the adjustment electrode 70 is formed on the same surface as the piezoelectric vibrator 33, the adjustment electrode 70 can be formed in the same process as the detection electrode 35 and the wires 44, 45. Thus, a manufacturing process can be simplified.

Further, according to the present embodiment, the thickness of the thin portion 52 of the cover 50 is smaller than the thickness of the thick portion 53 which surrounds the thin portion 52. Thus, when the electrostatic attractive force is generated, the facing portion 51 of the cover 50 is easily deformed toward the membrane structure 34. Therefore, the displacement of the peak of the resonance frequency between in the transmitting state and in the receiving state can be more effectively reduced.

Further, according to the present embodiment, the rigidity of the thin portion 52 of the cover 50 is lower than the rigidity of the membrane structure 34. Thus, when the electrostatic attractive force is generated, the facing portion 51 of the cover 50 is easily deformed compared to the membrane structure 34. Therefore, although the cover 50 is deformed by the electrostatic attractive force so that the gap distance D can be reduced, deformation of the membrane structure 34 can be reduced.

In the present embodiment, the metal layer 46 formed on the first surface 31a of the substrate 31 is joined through solder or the like to the metal layer 55 formed on the surface of the thick portion 53 of the cover 50. However, the cover 50 can be fixed to the substrate 31 by a method different from the above example. For example, the cover 50 can be fixed to the substrate 31 by adhesive. When the cover 50 is made from silicon, the cover 50 can be fixed to silicon of the semiconductor layer 40 of the substrate 31 by direct bonding.

(Modification)

In the present embodiment, the ultrasonic sensor device 10 includes the circuit chip 12 and the wiring board 13 separate from the sensor unit 11. Alternatively, the processing circuit 110 of the circuit chip 12 can be formed (Integrated) in the sensor unit 11.

In the present embodiment, the electrostatic attractive force is generated by applying the adjustment voltage, only when the membrane structure 34 is in the receiving state. Alternatively, the electrostatic attractive force can be generated by applying the adjustment voltage, when the membrane structure 34 is in the receiving state and in the transmitting state. The electrostatic attractive force is proportional to the square of the application voltage. Therefore, when the application voltage is higher in the receiving state than in the transmitting state, the gap distance D2 in the receiving state can be smaller than the gap distance D1 in the transmitting state so that the Q-factor can be smaller in the receiving state than in the transmitting state. However, when the adjustment voltage is applied only when the membrane structure 34 is in the receiving state, the adjustment voltage can be small.

According to the present embodiment, the thick portion 43 has a ring shape and surrounds the thin portion 32 in the perpendicular direction. Alternatively, the thin portion 32 can bridge between two thick portions 43. In this case, at least part of the cover 50 is fixed to the thin portion 32.

Figure 11:
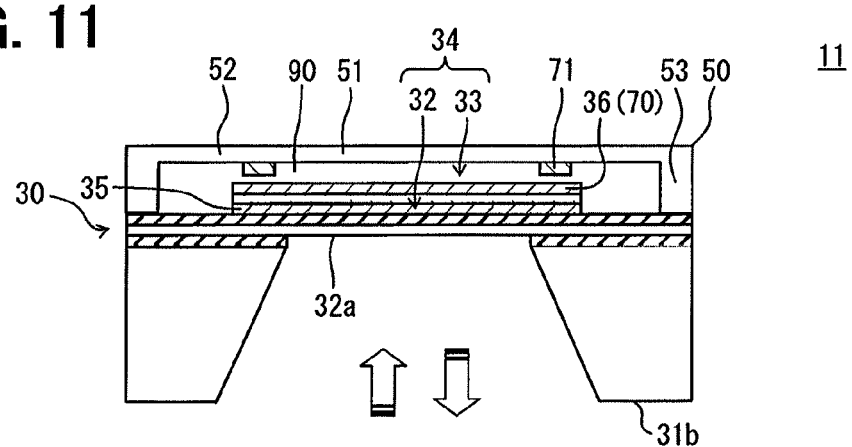
FIG. 11 is a diagram illustrating a cross-sectional view of an adjustment electrode according to a modification.

According to the present embodiment, the adjustment electrode 70 on the ultrasonic sensor 30 is formed separately from the detection electrodes 35, 36 of the piezoelectric vibrator 33. Alternatively, one of the detection electrodes 35, 36 of the piezoelectric vibrator 33 can be also used as the adjustment electrode 70. In an example shown in FIG. 11, the detection electrode 36, which is closer to the facing portion 51 in the thickness direction, is also used as the adjustment electrode 70. In such an approach, the structure of the sensor unit 11, i.e., the structure of the ultrasonic sensor device 10 can be simplified.

However, the detection electrodes 35, 36 are located in the thin portion 32 of the substrate 31. Therefore, when the detection electrode 36 is also used as the adjustment electrode 70, the membrane structure 34 is easily deformed by the electrostatic attractive force as compared to when the adjustment electrode 70 is formed in the thick portion 43. Therefore, it is preferable that the adjustment electrode 71 on the cover 50 should be formed at a position corresponding to the thick portion (43) of the substrate 31 in the perpendicular direction. In such an approach, even when the detection electrode 36 is also used as the adjustment electrode 70, deformation of the membrane structure 34 can be reduced. When the adjustment electrode 71 on the cover 50 is formed at a position facing the detection electrode 36, which is also used as the adjustment electrode 70, the rigidity of the facing portion 51 (the thin portion 52) of the cover 50 including the adjustment electrode 70 needs to be lower than the rigidity of the membrane structure 34.

Figure 12:
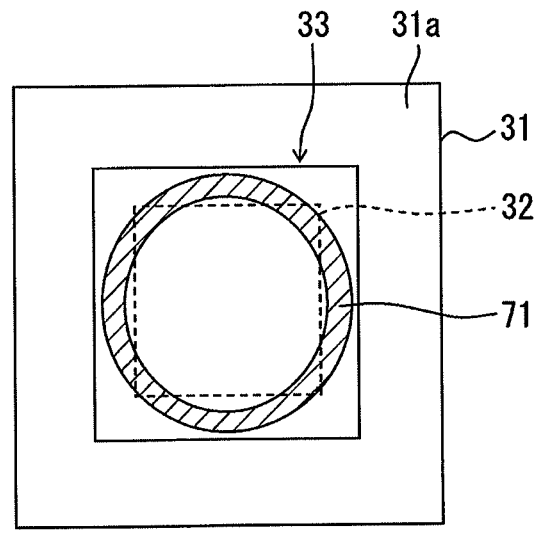
FIG. 12 is a diagram illustrating a plan view of a layout of an adjustment electrode on a cover according to a modification, in which the adjustment electrode on the cover is Illustrated as overlapping a surface of a substrate for the sake of convenience.

In the present embodiment, the adjustment electrode 70 on the ultrasonic sensor 30 has a C-shape formed by removing a portion of a rectangular ring shape, and the adjustment electrode 71 on the cover 50 has a rectangular ring shape. Alternatively, the adjustment electrode 70 on the ultrasonic sensor 30 can have a C-shape formed by removing a portion of a circular ring shape, and the adjustment electrode 71 on the cover 50 can have a circular ring shape. In this case, when the center of the adjustment electrode 71 coincides with the center of the thin portion 52, the thin portion 52 can be deformed uniformly as compared to when the adjustment electrode 71 has a rectangular ring shape. It is noted that FIG. 12 shows the adjustment electrode 71 on the cover 50 to indicate a positional relationship.

In the present embodiment, the adjustment electrode 70 on the ultrasonic sensor 30 has a C-shape with open ends (free ends), and the wires 44, 45 of the detection electrodes 35, 36 of the piezoelectric vibrator 33 are drawn from between the open ends. Alternatively, the adjustment electrode 70 can have a ring shape by forming the wires 44, 45 as underlying wires of the adjustment electrode 70. Alternatively, the adjustment electrode 70 can have a ring shape by forming the wire 72 or both the adjustment electrode 70 and the wire 72 as underlying wires of the wires 44, 45.

According to the present embodiment, the sealed space 90 is filled with air. However, the sealed space 90 can be filled with gas other than air. For example, the sealed space 90 can be filled with gas having a viscosity coefficient μ larger than that of air. The damping factor C is proportional to a viscosity coefficient μ of gas that fills the sealed space 90. Therefore, the adjustment voltage can be reduced by filling the sealed space 90 with gas (e.g. helium) having the viscosity coefficient μ larger than that of air. Assuming that the adjustment voltage is maintained unchanged, a difference between the Q-factor in the transmitting state and the Q-factor in the receiving state is increased as compared to when the sealed space 90 is filled with air. Thus, even when the amount of Doppler shift is large, it is possible to detect the target object.

In the embodiment, the adjustment electrode 71 on the cover 50 is formed on the inner surface (the surface facing the substrate 31) of the thin portion 52 of the cover 50. Alternatively, the adjustment electrode 71 can be formed on the outer surface of the thin portion 52. In such an approach, the structure can be simplified.

Second Embodiment

Figure 13:
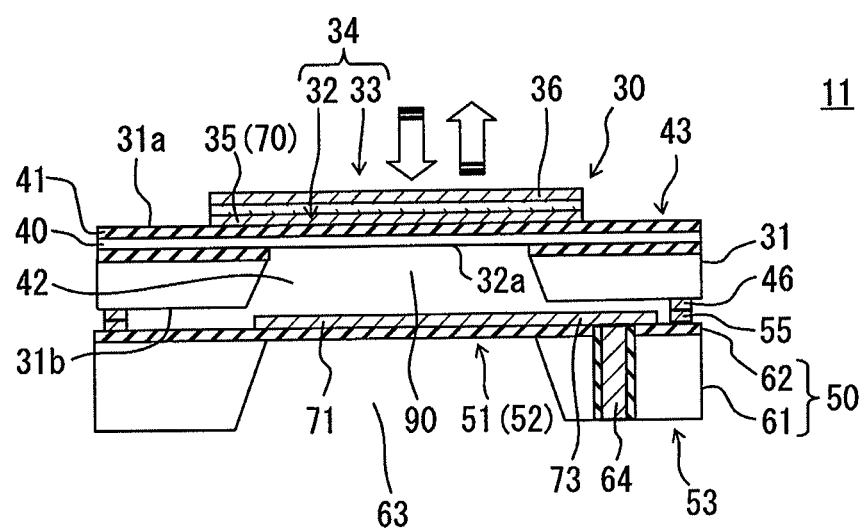
FIG. 13 is a diagram illustrating a cross-sectional view of a sensor unit of an ultrasonic sensor device according to a second embodiment.

According to the first embodiment, the cover 50 is fixed to the first surface 31a of the substrate 31, and the piezoelectric vibrator 33 is accommodated in the sealed space 90. In contrast, according to the present embodiment, as shown in FIG. 13, the cover 50 is fixed to the second surface 31b of the substrate 31. Therefore, transmission and reception of ultrasonic waves are performed on the first surface 31a side of the substrate 31, unlike the first embodiment in which the transmission and reception of ultrasonic waves are performed on the second surface 31b side of the substrate 31.

In an example shown in FIG. 13, the ultrasonic sensor 30 has almost the same structure as that in the first embodiment. In FIG. 13, the metal layer 46 for junction is formed on the second surface 31b of the substrate 31 in the thick portion 43. Further, the detection electrode 35 of the piezoelectric vibrator 33 is also used as the adjustment electrode 70 on the ultrasonic sensor 30.

The cover 50 includes a semiconductor substrate 61 and an insulating layer 62. To form the facing portion 51 of the cover 50, an opening portion 63 with a bottom defined by the insulating layer 62 is formed by removing a portion of the semiconductor substrate 61. According to the present embodiment, the semiconductor substrate 61 is made from silicon, and a wall of the opening portion of the semiconductor substrate 61 has a (111) face.

In the cover 50, a portion of the insulating layer 62 bridging over the opening portion 63 serves as the thin portion 52. In the example of FIG. 13, the thin portion 52 is provided by only the facing portion 51. The metal layer 55 for a junction is formed on the opposite surface of the insulating layer 62 from the semiconductor substrate 61 in the thick portion 53 of the cover 50. The metal layer 55 is joined to the metal layer 46 of the ultrasonic sensor 30 so that a sealed space 90 including the opening portion 42 of the substrate 31 can be formed.

The adjustment electrode 71 on the cover 50 is formed on the surface of the insulating layer 62, where the metal layer 55 is formed, in the facing portion 51. The facing portion 51 (the thin portion 52) has a rectangular shape in plan view, and the adjustment electrode 71 is slightly larger than the facing portion 51 to cover the whole of the facing portion 51 in the perpendicular direction. The adjustment electrode 71 is electrically connected through a wire 73 to a through electrode 64 that penetrates the semiconductor substrate 61 and the insulating layer 62.

As described above, according to the present embodiment, the facing portion 51 of the cover 50 is provided by the insulating layer 62 and the adjustment electrode 71. On the other hand, like in the first embodiment, the membrane structure 34 of the ultrasonic sensor 30 is provided by the thin portion 32 (the semiconductor layer 40 and the insulating layer 41) of the substrate 31 and the piezoelectric vibrator 33. Therefore, the rigidity of the facing portion 51 of the cover 50 including the adjustment electrode 70 is lower than the rigidity of the membrane structure 34.

Even such a structure is employed, the same advantages as those obtained by the ultrasonic sensor device 10 according to the first embodiment can be obtained.

Further, since the detection electrode 35 is also used as the adjustment electrode 70, the structure of the sensor unit 11, i.e., the structure of the ultrasonic sensor device 10. Alternatively, the detection electrode 36 can be also used as the adjustment electrode 70. Alternatively, the adjustment electrode 70 can be formed separately from the detection electrodes 35, 36. For example, the adjustment electrode 70 can be formed between the semiconductor layer 40 and the insulating layer 41 or formed on the surface 32a of the thin portion 32. That is, the adjustment electrode 70 can be formed at any position within a formation region of the membrane structure 34.

In the present embodiment, the cover 50 is provided by the semiconductor substrate 61 and the insulating layer 62. The structure of the cover 50 is not limited to the above example. For example, like in the first embodiment, the cover 50 can be made from resin.

Third Embodiment

In the first embodiment, at the time of reception, the predetermined voltage, which is preset in advance, is applied as the adjustment voltage between the adjustment electrodes 70, 71. In contrast, in the present embodiment, a frequency of a reception signal is calculated by the DSP 117, and the controller 111 calculates a difference between the calculated frequency of the reception signal and a frequency of a drive signal, i.e., a frequency of a transmission signal. Then, the controller 111 commands the adjustment voltage generator 118 to generate the predetermined voltage based on the frequency difference.

A transmitting and receiving process according to the present embodiment is described below with reference to FIG. 14.

A transmitting process performed at step 20 is the same as that performed at step 10 of the first embodiment (refer to FIG. 7). As described above, according to the present embodiment, an ultrasonic wave is transmitted from the first surface 31a side of the substrate 31. A frequency of the ultrasonic wave is equal to the frequency f1 of the drive signal.

After the ultrasonic wave is transmitted, the controller 111 determines whether the amplitude of the reception signal of the piezoelectric vibrator 33 calculated by the DSP 117 is larger than the predetermined threshold value prestored in the memory of the DSP 117. That is, the controller 111 determines whether the ultrasonic sensor 30 (the piezoelectric vibrator 33) receives the reflected wave (step 21).

If it is determined at step 21 that the amplitude of the reception signal of the piezoelectric vibrator 33 is smaller than the threshold value during a time period when the reflected wave can be received after the drive signal is generated, steps 20 and 21 are repeated. In contrast, if the amplitude of the reception signal of the piezoelectric vibrator 33 is larger than the threshold value, the controller 111 calculates a difference between the frequency of the reception signal calculated by the DSP 117 and the frequency f1 of the drive signal stored in the memory of the controller 111 (step 22). This step 22 corresponds to a frequency difference calculating section recited in claims.

Then, based on the calculated frequency difference, the controller 111 determines a value of a voltage to be generated by the adjustment voltage generator 118 (step 23). This step 23 corresponds to a voltage value determining section recited in claims. For example, as the frequency difference is larger, i.e., as the amount of Doppler shift is larger, the voltage value for the adjustment voltage is set to a larger value so that the Q-factor of the membrane structure 34 can be smaller.

After the voltage value for the adjustment voltage is determined, like at S20, the transmitting process of the ultrasonic wave is performed (step 24). The command signal for the adjustment voltage generation is not outputted from the controller 111 to the adjustment voltage generator 118.

After the transmitting process (step 24) is finished, the controller 111 commands the adjustment voltage generator 118 to generate the adjustment voltage having the voltage value determined at steps 20-23. In response to this, the adjustment voltage generator 118 applies the adjustment voltage between the adjustment electrodes 70, 71. This step 25 corresponds to a voltage applying section recited in claims. The subsequent steps 26-28 are the same as steps 12-14 of the first embodiment.

As described above, according to the present embodiment, the voltage value for the adjustment voltage to be applied between the adjustment electrodes 70, 71 is determined based the difference between the transmission frequency and the frequency of the received reflected wave. In such an approach, the Q-factor in the receiving state is set according to a moving state (e.g., speed) of the relatively moving target object. Therefore, the target object can be accurately detected regardless of the relative moving state of the target object.

Figure 14:
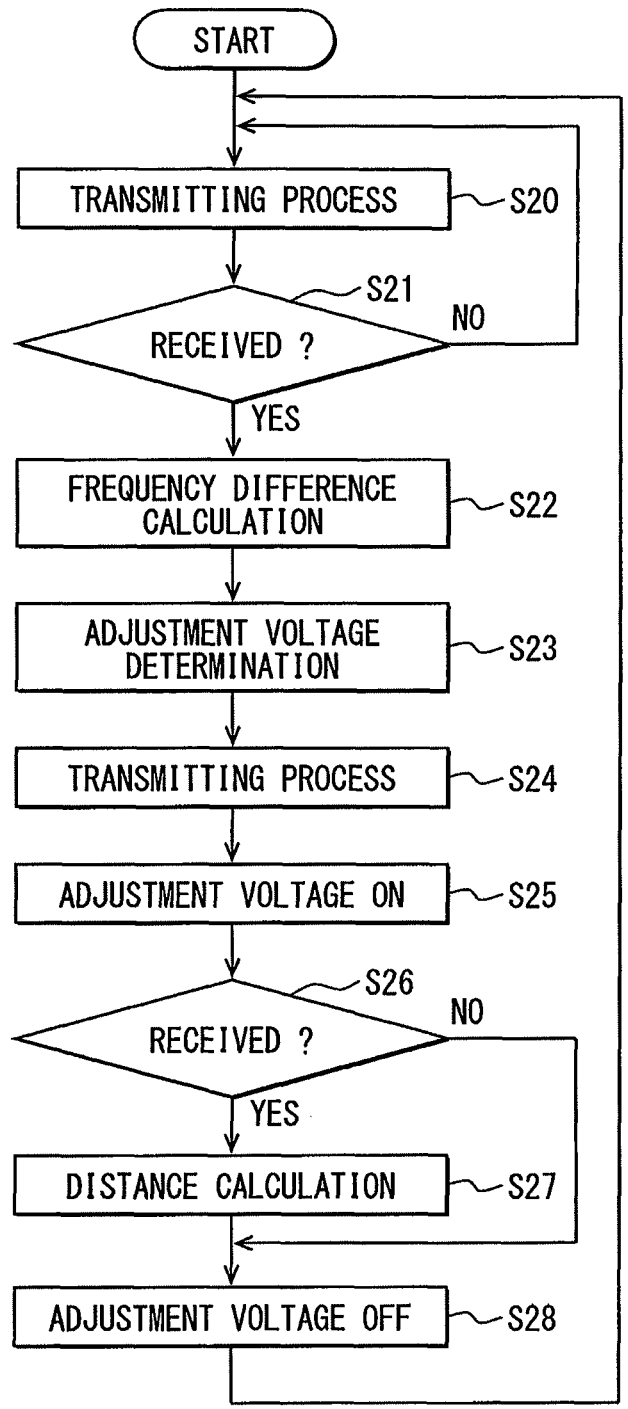
FIG. 14 is a flow chart of a transmitting and receiving process of an ultrasonic sensor device according to a third embodiment.

In the flowchart shown in FIG. 14, steps 20-23 are performed each time steps 24-28 are performed once. Alternatively, steps 24-28 can be repeatedly performed during a predetermined time period. That is, the transmitting and receiving process can be performed multiple times by using the adjustment voltage having the determined voltage value.

Other Embodiments

While the present disclosure has been described with reference to embodiments thereof, it is to be understood that the disclosure is not limited to the embodiments. The present disclosure is intended to cover various modifications and equivalent arrangements within the spirit and scope of the present disclosure.

In the above embodiments, when the processing circuit 110 applies the voltage between the adjustment electrodes 70, 71, the gap distance D between the facing portion 51 of the cover 50 and the membrane structure 34 is changed by electrostatic force so that the Q-factor of the membrane structure 34 can be changed. That is, the adjustment electrodes 70, 71 serve as a Q-factor adjuster. The Q-factor adjuster is not limited to the above embodiments.

Figure 15:
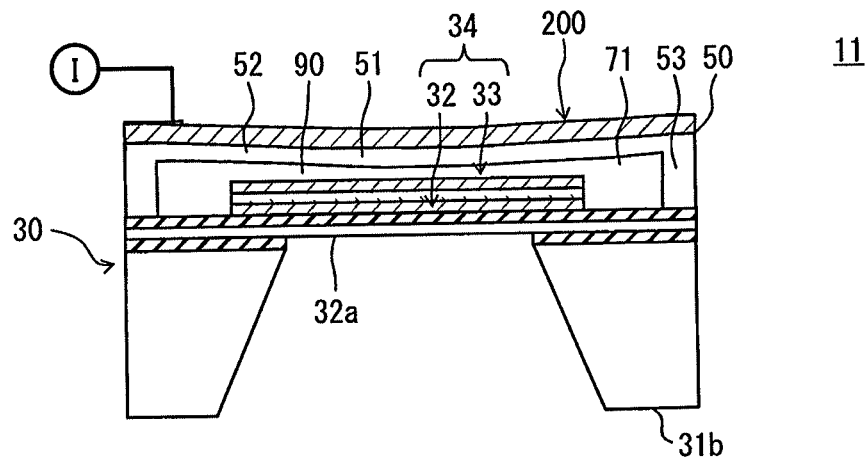
FIG. 15 is a diagram illustrating a cross-sectional view of an ultrasonic sensor device according to another embodiment.

In an example shown in FIG. 15, a film 200 having a thermal expansion coefficient different from that of the cover 50 is placed on a top surface of the cover 50, and electric current is supplied to the cover 50 or the film 200 to generate heat. As a result, the cover 50 is deformed due to a difference in the thermal expansion coefficient so that the gap distance D can be changed. That is, the film 200 serves as a Q-factor adjuster.

Figure 16:
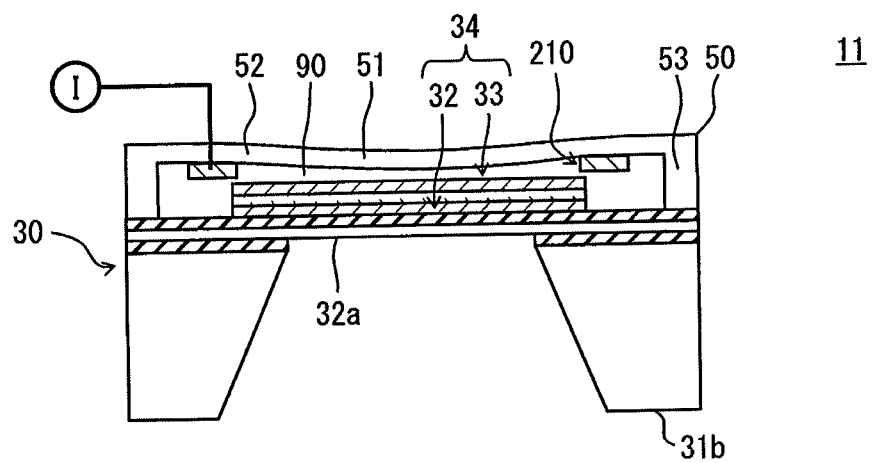
FIG. 16 is a diagram illustrating a cross-sectional view of an ultrasonic sensor device according to another embodiment.

In an example shown in FIG. 16, a piezoelectric body 210 is fixed to the Inner surface of the cover 50, and electric current is supplied to the piezoelectric body 210 so that the piezoelectric body 210 can be distorted. As a result, the cover 50 is deformed so that the gap distance D can be changed. That is, the piezoelectric body 210 serves as a Q-factor adjuster.

Figure 17:
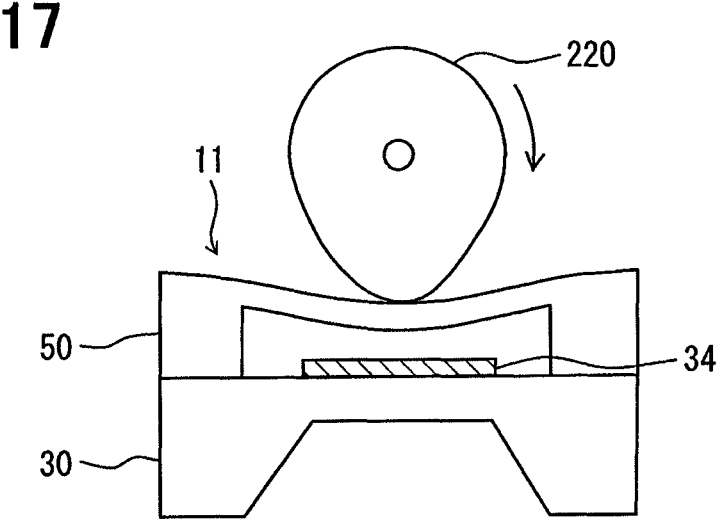
FIG. 17 is a diagram illustrating a cross-sectional view of an ultrasonic sensor device according to another embodiment.

In an example shown in FIG. 17, a cam 220 is provided above the cover 50. When the cam 220 rotates to a predetermined angle, the cam 220 is in contact with and presses the top surface of the cover 50. As a result, the cover 50 is deformed so that the gap distance D can be changed. That is, the cam 220 serves as a Q-factor adjuster.

Figure 18:
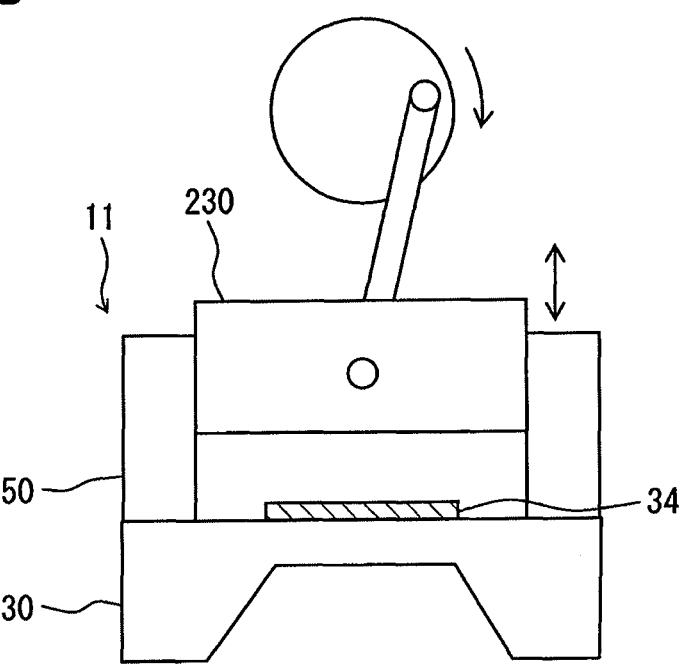
FIG. 18 is a diagram illustrating a cross-sectional view of an ultrasonic sensor device according to another embodiment.

In an example shown in FIG. 18, a roof of the cover 50 is removed, and a piston 230 is contact with and slides on a side surface of the cover 50 to form the sealed space 90. In this example, the gap distance D is a distance between a lower surface of the piston 230 and the membrane structure 34. When the piston 230 moves up and down, the gap distance D changes accordingly. That is, the piston 230 serves as a Q-factor adjuster.

Figure 19:
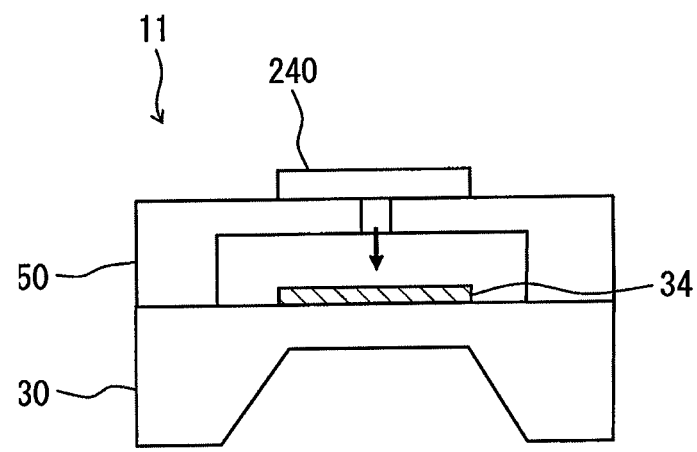
FIG. 19 is a diagram illustrating a cross-sectional view of an ultrasonic sensor device according to another embodiment.

In an example shown in FIG. 19, a through hole is formed in the roof of the cover 50, and a pump 240 is connected to the sealed space 90 through the through hole. The pump 240 changes the viscosity coefficient μ of the gas in the sealed space 90 by changing temperature or pressure inside the sealed space 90. As mentioned previously, the damping factor C of the sealed space 90 is proportional to the viscosity coefficient μ of the gas in the sealed space 90. Therefore, the damping factor C of the sealed space 90 can be changed by changing temperature or pressure inside the sealed space 90. Accordingly, the Q-factor of the membrane structure 34 can be changed. That is, the pump 240 serves as a Q-factor adjuster.

Alternatively, the pump 240 can change the damping factor C of the sealed space 90, i.e., the Q-factor of the membrane structure 34 by replacing the gas in the sealed space 90. For example, the sealed space 90 can be filled with a first gas (e.g., air) having a small viscosity coefficient at the time of transmission of the ultrasonic wave and filled with a second gas (e.g., helium) having a viscosity coefficient larger than that of the first gas at the time of reception of the ultrasonic wave.

Figure 20:
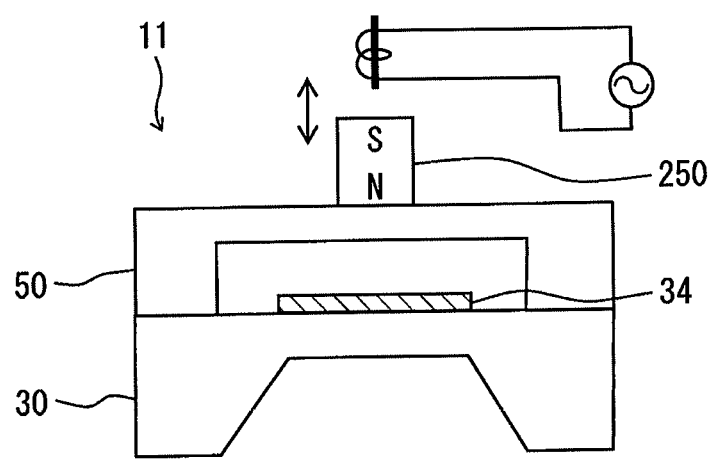
FIG. 20 is a diagram illustrating a cross-sectional view of an ultrasonic sensor device according to another embodiment.

In an example shown in FIG. 20, a magnet 250 is fixed to the top surface of the cover 50, and an electric current is supplied to a coil located near the magnet 250 so that a magnetic field can be produced around the magnet 250. As a result, the cover 50 is deformed so that the gap distance D can be changed. That is, the magnet 250 serves as a Q-factor adjuster.

Figure 21:
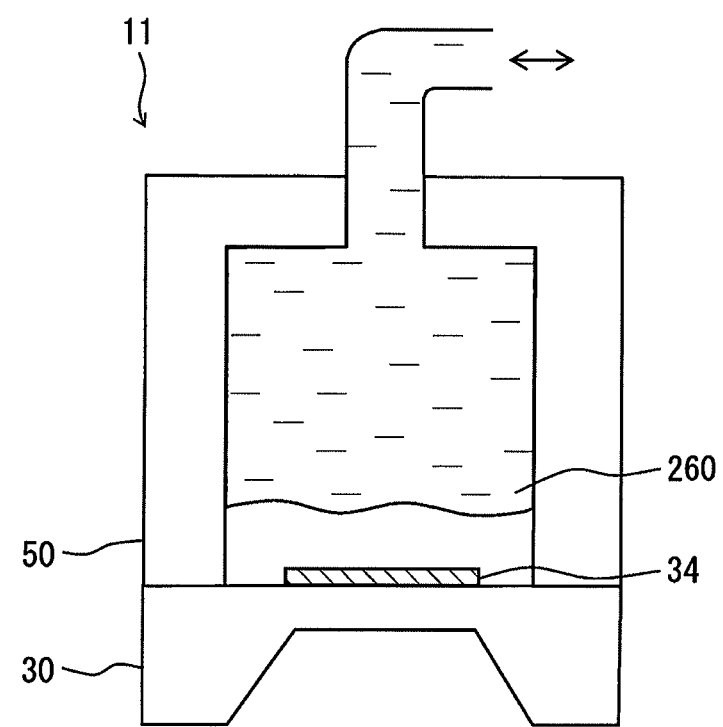
FIG. 21 is a diagram illustrating a cross-sectional view of an ultrasonic sensor device according to another embodiment.

In an example shown in FIG. 21, the cover 50 and a diaphragm 260 form an oil pressure diaphragm for changing pressure or temperature of the gas in the sealed space 90. That is, the diaphragm 260 serves as a Q-factor adjuster.

As described above, according to the examples shown in FIGS. 15-21, the Q-factor of the membrane structure 34 is changed by changing the gap distance D or by changing the viscosity coefficient of the gas in the sealed space 90. Alternatively, a member, which is capable of expanding and contracting due to heat or the like, can be attached to the membrane structure 34 to change stress on the membrane structure 34. Thus, the Q-factor of the membrane structure 34 can be changed. In this case, the member serves as a Q-factor adjuster.

What is claimed is:

1. An ultrasonic sensor device comprising:
   an ultrasonic sensor including a substrate and a piezoelectric vibrator, and
   a Q-factor adjuster, wherein
   the piezoelectric vibrator includes a piezoelectric body interposed between a pair of detection electrodes that face each other in a thickness direction of the substrate,
   the piezoelectric vibrator provides a membrane structure that is formed on a first surface of the substrate and has rigidity lower than that of a remaining portion of the substrate,
   the ultrasonic sensor transmits an ultrasonic wave by the piezoelectric vibrator and receives its reflected wave by the same piezoelectric vibrator, and
   the Q-factor adjuster adjusts a Q-factor of the piezoelectric vibrator so that the Q-factor is larger during a transmission period where the piezoelectric vibrator transmits the ultrasonic wave than during a reception period where the piezoelectric vibrator receives the ultrasonic wave.

2. The ultrasonic sensor device according to claim 1, further comprising:
   a cover having a facing portion that faces and is spaced from the membrane structure in the thickness direction of the substrate, the cover being fixed to the substrate so that a sealed space filled with gas is formed between the cover and the substrate, wherein
   the Q-factor adjuster adjusts a gap distance between the facing portion and the membrane structure, thereby adjusting the Q-factor of the piezoelectric vibrator so that the Q-factor is larger during the transmission period where the piezoelectric vibrator transmits the ultrasonic wave than during the reception period where the piezoelectric vibrator receives the ultrasonic wave.

3. The ultrasonic sensor device according to claim 2, wherein
   the Q-factor adjuster includes a pair of adjustment electrodes and a controller for controlling energization of the adjustment electrodes,
   one of the adjustment electrodes is formed on the ultrasonic sensor, and the other of the adjustment electrodes is formed on the cover so that the adjustment electrodes face each other in the thickness direction of the substrate,
   when being energized, the adjustment electrodes generate electrostatic attractive force that causes the facing portion of the cover to move toward the membrane structure,
   the controller has a voltage applying section for applying a voltage between the adjustment electrodes at least when the piezoelectric vibrator is in a receiving state, and
   the voltage applying section controls the energization of the adjustment electrodes so that the gap distance between the facing portion of the cover and the membrane structure when the piezoelectric vibrator is in the receiving state is smaller than the gap distance between the facing portion of the cover and the membrane structure when the piezoelectric vibrator is in a transmitting state.

4. The ultrasonic sensor device according to claim 3, wherein
   the adjustment electrode on the ultrasonic sensor is formed on a thick portion of the substrate different from the thin portion.

5. The ultrasonic sensor device according to claim 4, wherein
   the thick portion has a ring shape to surround the thin portion in a direction perpendicular to the thickness direction of the substrate.

6. The ultrasonic sensor device according to claim 3, wherein
   the adjustment electrode on the ultrasonic sensor is formed on the first surface of the substrate.

7. The ultrasonic sensor device according to claim 3, wherein the cover has a center portion and a surrounding portion adjacent to the center portion, the center portion is thinner than the surrounding portion, and the facing portion and the adjustment electrode are formed in the center portion.

8. The ultrasonic sensor device according to claim 7, wherein rigidity of the center portion of the cover including the adjustment electrode on the cover is lower than rigidity of the membrane structure.

9. The ultrasonic sensor device according to claim 3, wherein one of the detection electrodes of the piezoelectric vibrator is also used as the adjustment electrode on the ultrasonic sensor, and the adjustment electrode on the cover is formed at a position corresponding to a thick portion of the substrate different from the thin portion in a direction perpendicular to the thickness direction of the substrate.

10. The ultrasonic sensor device according to claim 3, wherein the cover is fixed to a second surface of the substrate opposite to the first surface of the substrate, the piezoelectric vibrator is formed on a first surface of the thin portion, the facing portion faces a second surface of the thin portion opposite to the first surface of the thin portion, the adjustment electrode on the cover is formed on the facing portion, the adjustment electrode on the ultrasonic sensor is formed on the membrane structure, and rigidity of the facing portion of the cover including the adjustment electrode on the cover is lower than rigidity of the membrane structure.

11. The ultrasonic sensor device according to claim 10, wherein one of the detection electrodes of the piezoelectric vibrator is also used as the adjustment electrode on the ultrasonic sensor.

12. The ultrasonic sensor device according to claim 3, wherein the voltage applying section applies the voltage to the adjustment electrodes only when the piezoelectric vibrator is in the receiving state.

13. The ultrasonic sensor device according to claim 12, wherein the controller includes a frequency difference calculating section and a voltage value determining section, the frequency difference calculating section calculates a difference between a frequency of the ultrasonic wave, which is transmitted by the piezoelectric vibrator under a condition that no voltage is applied to the adjustment electrodes, and a frequency of the reflected wave of the transmitted ultrasonic wave, the voltage value determining section determines a voltage value for the voltage applied to the adjustment electrodes based on the frequency difference calculated by the frequency difference calculating section, and the voltage applying section applies the voltage, which has the voltage value determined by the voltage value determining section, to the adjustment electrodes.

14. The ultrasonic sensor device according to claim 2, wherein the cover is fixed to the first surface of the substrate, and the piezoelectric vibrator is accommodated in the sealed space between the cover and the substrate.

15. The ultrasonic sensor device according to claim 2, wherein the gas that fills the sealed space is air.

16. The ultrasonic sensor device according to claim 2, wherein the gas that fills the sealed space has a viscosity coefficient larger than air.

17. The ultrasonic sensor device according to claim 1, wherein the substrate has a thin portion, the piezoelectric vibrator is formed on the first surface of the substrate in the thin portion, and the piezoelectric vibrator and the thin portion provide the membrane structure.

\* \* \* \* \*